United States Patent [19]

Nopper et al.

[11] Patent Number: 5,021,638

[45] Date of Patent: Jun. 4, 1991

[54] KEYBOARD COVER

[75] Inventors: Leroy N. Nopper, Irvine; Meryl E. Miller, Rancho Palos Verdes; James L. Lichte, Riverside, all of Calif.

[73] Assignee: Lucas Duraltih Corporation, Millville, N.J.

[21] Appl. No.: 89,812

[22] Filed: Aug. 27, 1987

[51] Int. Cl.$^5$ .............................................. G06C 7/02
[52] U.S. Cl. ........................... 235/145 R; 235/145 A; 200/302.2; 200/304
[58] Field of Search ............... 235/145 R, 145 A; 379/451, 452, 447, 368; 200/302.1, 302.2, 304, 309; 400/496, 714

[56] References Cited

U.S. PATENT DOCUMENTS

| | | | |
|---|---|---|---|
| 3,372,246 | 3/1968 | Knuepfer | 379/368 |
| 3,657,492 | 4/1972 | Arndt et al. | 200/5 R |
| 4,039,068 | 8/1977 | Giorza et al. | 235/145 R X |
| 4,075,465 | 2/1978 | Funk et al. | 235/145 R |
| 4,352,968 | 10/1982 | Pounds | 200/302.2 |
| 4,396,830 | 8/1983 | Isozaki et al. | 235/145 R |
| 4,421,966 | 12/1983 | Pounds | 200/309 |
| 4,436,965 | 3/1984 | Morse | 379/447 |
| 4,438,300 | 3/1984 | Morse | 379/447 |
| 4,501,936 | 2/1985 | Morse | 379/451 |

FOREIGN PATENT DOCUMENTS 2152437A 8/1985 United Kingdom .

OTHER PUBLICATIONS

IBM Technical Disclosure Bulletin, Keyboard Transducer, H. C. Kuntzleman, vol. 7, No. 12, May 1965.
IBM Technical Disclosure Bulletin, Plastic Keyboard Translator, C. C. Kling; vol. 4, No. 12, May 1962.

*Primary Examiner*—Benjamin R. Fuller
*Attorney, Agent, or Firm*—Nixon & Vanderhye

[57] ABSTRACT

A protective cover or boot for a keyboard array is provided which prevents entry of contaminants, such as water, dust and the like into the interior of the keyboard assembly. A membrane of a resilient material, such as a silicone rubber, is used to form a one-piece cover which extends over the keyboard array as well as the obverse face of the keyboard assembly and, in cooperation with a plate, acts as a seal to totally encapsulate the keyboard assembly. The elastomeric cover is formed as a low-cost material of generally uniform thickness and is molded to a shape so as to cover the top portion of the individual keys as well as extend partially down the side walls thereof so as to be spaced from the deck of the keyboard assembly by a distance which is equal to or greater than the length of travel of the key when actuated. The sidewalls of the membrane cover between individual keys are therefore not placed in compression and thus the "touch" and "feel" of the individual keys is retained even though the elastomeric cover is placed in its operative position.

10 Claims, 1 Drawing Sheet

KEYBOARD COVER

BACKGROUND OF THE INVENTION

1. Field of the Invention

The present invention relates generally to environmental protective devices and specifically to covers for computer keyboards, keypads and the like.

In recent years the use of keyboards has increased dramatically for industrial, business and personal use. Keyboards are an integral part of many machines such as word processing devices, personal computers (PC), typewriters, calculators, touch tone telephone devices and the like.

Although the display of such keyboards vary from device-to-device, each represents a series or array of keys which are movable through a deck portion of the keyboard in order to generate an electrical or mechanical signal by movement of one or more keys. However the presence of passages in the deck portion in the vicinity of the movable keys permits access of various contaminants such as water, dust and the like to the interior of the keyboard. The entry of such contaminants affects the internal operation resulting in malfunction of the keyboard. It is therefore one of the objects of the present invention to provide a keyboard that prevents the entry of contaminants into the interior of the keyboard, especially in those passages between the keys and the deck of the keyboard.

2. Description of the Prior Art

The prior art has attempted to restrict entry of contaminants into the interior of a keyboard by the use of an elastomeric boot or cover such as is described in U.S. Pat. Nos. 3,372,246, 4,039,068, 4,436,965, 4,438,300 and 4,501,936.

Although each of these prior art attempts provides a cover or boot which aids in eliminating the entry of contaminants, the prior art attempts do not successfully solve the problem. One failure of the prior art is that the "touch" or "feel" of the keyboard, as is normally associated by the operator of the keyboard with each individual key, is lost due to the cover material of the prior art. Thus, deprivation of the keyboard operator's sense of touch or feel of the individual keys was a significant drawback associated with the keyboard covers of the prior art. Further, although these prior art covers were an aid in reducing entry of contaminants, none eliminated contamination of keyboard assemblies.

Other prior art attempts at providing keyboard covers were concerned with providing overlays or "masks" on the keyboard such that new indicia were provided on the cover which differed from the indicia found on the original keyboard. Such prior art attempts can be found in Great Britain published application Ser. No. 2,152,437A and the IBM Technical Disclosure Bulletins, Vol. 4, No. 12, May, 1962 entitled "Plastic Keyboard Translator" by C. C. Kling, Vol. 7, No. 12, May 1965 entitled "Keyboard Transducer" by H. C. Kuntzleman. Although these keyboard covers, or masks, cover the keys it was the aim of such devices to provide a translation device for the keyboard and they are not very effective in preventing contaminants from entering the interior of the keyboard.

Additional prior art attempts to provide means to prevent contamination of keyboards can be found in U.S. Pat. Nos. 3,657,492, 4,352,968 and 4,396,830. However, none of these attempts provides a satisfactory cover for completely preventing contamination of the interior of the keyboard while preserving the "touch" or "feel" of the individual keys of the keyboard.

SUMMARY OF THE INVENTION

It is an object of the present invention to provide a keyboard cover which prevents the entry of contaminants, such as water, dust and the like, into the interior of the keyboard.

It is also an object of the invention to provide a keyboard cover whereby the "touch" or "feel" of the individual keys of the keyboard is retained when the keyboard cover is in its operative position.

The above and other objects are achieved by providing a low-cost membrane type keyboard assembly cover comprising an elastomeric type material, such as silicone rubber, which has been formed so as to cover the keys of the keyboard array.

In a particularly preferred embodiment of the invention the low-cost membrane keyboard cover is formed so as to extend over the keys and towards by not touching the deck portions of the keyboard except where it is far enough from the key so as to not to affect the "feel" or action of the key and around to the obverse face of the keyboard assembly to thereby be held in compression by unitary plate means so as to provide a completely sealed keyboard assembly.

It is a further embodiment of the present invention to provide a low-cost membrane keyboard assembly cover wherein the "touch" or "feel" of the individual keys of the keyboard assembly are retained when the membrane cover is in its operative position.

These and other embodiments of the present invention will be more fully understood by reference to the drawings and preferred embodiments described hereinbelow.

BRIEF DESCRIPTION OF THE DRAWINGS

Additional advantages and features of the present invention will become apparent and fully understood from a reading of the following description taken together with the annexed drawings in which.

DESCRIPTION OF THE PREFERRED EMBODIMENT

Figure 1:
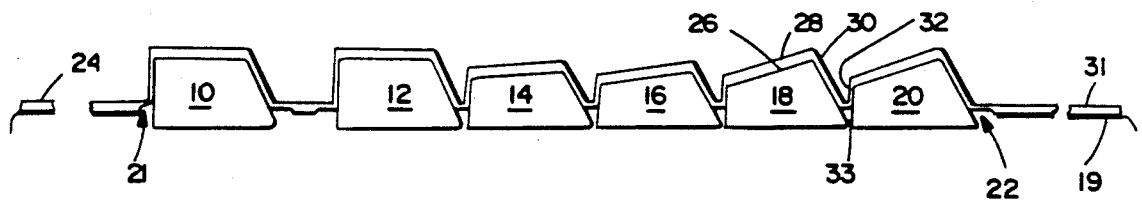
FIG. 1 is a partial, cross-sectional, schematic representation through a keyboard array.

FIG. 1 illustrates a plurality of keys over which the low-cost membrane of the present invention has been applied. Although keyboard arrays vary from device-to-device they are usually arranged in a plurality of rows, occasionally containing columns so as to provide a two-dimensional array of individual keys. However, it is to be understood that the particulars of the arrangement of individual keys in the key array is not part of the present invention as the keyboard cover of the invention may be modified by those having ordinary skill in the art so as to "fit" keyboards of various arrays.

Each of the keys 10, 12, 14, 16, 18 and 20 extend through the molded cover or housing 19 of the keyboard assembly in a manner well known, per se. Although not shown, it is to be understood that each of keys 10, 12, 14, 16, 18 and 20 may operate, either electronically or mechanically alone, or through intervening means (not shown), so as to generate a signal to the device with which the keyboard is associated. The keys illustrated in the various figures of the drawing all have tapered sidewalls. However, it is to be understood that keyboards of different manufacture may have keys of more or less sidewall taper than illustrated in the appended drawings. Additionally, some keys may have sidewalls where the degree of taper is zero, i.e. vertically disposed sidewalls. It is to be understood that the protective cover of the present invention can be shaped to "fit" all such key configurations.

Figure 2:
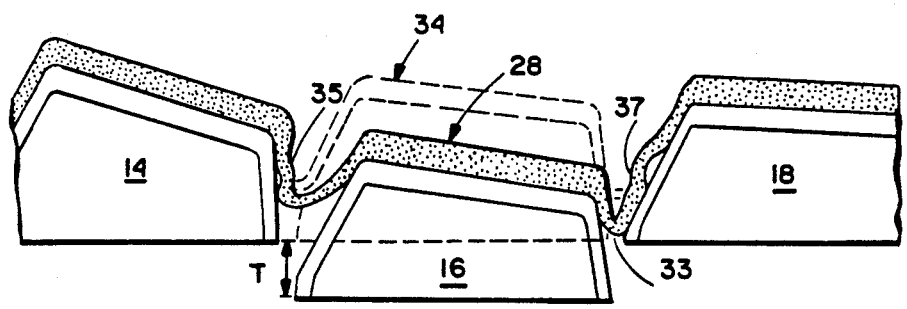
FIG. 2 is an enlarged, partial view of FIG. 1 showing details of the membrane cover and its associated keys and the orientation of the keyboard cover when one of the keys in its activated position.

With reference to FIG. 2 of the drawings it will be appreciated that openings 21 and 22 exist between housing 19 and the keys of the keyboard array. These openings 21 and 22 permit entry of water, dust and other contaminants to the interior of the keyboard affecting the operation thereof. In order to prevent the entry of such contaminants the present invention utilizes a membrane 24, formed of an elastomeric material such as silicone rubber. The elastomeric material is preferably opaque but may be transparent, so that the operator may visually view the indicia normally visible on the top surface 26 of the individual keys. These indicia may be a numeral, or an alphabetic character, or a command symbol or a visual signal such as light or a combination of the same. The indicia may be in a language other than English. The various indicia of the keys is not part of the present invention although it is to be understood that various indicia corresponding to, or different from the indicia on the keys of the keyboard may be formed on the cover of the present invention. However, in a particularly preferred embodiment the cover of the present invention is partially transparent permitting the indicia of the keys to be viewed by the operator thereof. The method of manufacturing a partially transparent key cover is disclosed in U.S. pat. application Ser. No. 071, 410 filed Jul. 9, 1987, commonly assigned, the disclosure of all of which is herein incorporated by reference. A suitable material as the low-cost membrane of the present invention is a silicone rubber sold by Dow-Corning Corporation of Midland, Mich., under the trademark SILASTIC 595.

It is preferred to injection mold the elastomerica material but other methods of forming, such as transfer molding or vacuum forming, may suitably be employed. The thickness of the membrane varies throughout the keyboard array with the key cover portion 28 of membrane 24 overlying the top surface 26 of the keys being generally thicker that the sidewall portions 30, 32 of membrane 24 extending into the valley between adjacent keys. Although the thickness, per se, is not critical, applicants have found that a thickness of about 0.020 to 0.025 inches is suitable for the sidewall portions 30, 32 in various environments. The thickness of the key cover portion 28 of membrane 24 overlying the keys is suitably 0.050 to 0.065, preferably 0.062 inches, although this thickness may vary where unusual conditions of impact and/or abrasion are encountered. The portion 31 of membrane 24 overlying housing 19 is of a thickness comparable to that of key cover portion 28, preferably 0.052 inches. The present applicants have maintained the "touch" or "feel" of the individual keys by employing a membrane of relatively uniform thickness, not only in the key cover portion 28 of the membrane but also within key sidewalls 30 and 32. In order to prevent the loss of the "touch" or "feel" when utilizing a keyboard array covered with a membrane of the present invention it is necessary that the sidewalls 30 and 32 not be permitted to extend all the way into the valley 33 between the keys of the keyboard assembly.

It is to be appreciated that the individual keys of the keyboard array generally have a distance of travel T when the key is actuated to move it from its inoperative (up) to its operative (down) position as is shown by dotted line illustrating inoperative (up) position 34 of the key 16 in FIG. 2. The key cover portion 28 moves downwardly with key 16 as shown in FIG. 2. In order to assure that little or no force is required by the operator to move the sidewalls 30, 32 of the membrane and to prevent compression of such sidewalls upon movement thereof, thereby decreasing the "touch" or "feel" of each key, it is necessary to assure that the lower portion of the sidewalls 30, 32 do not extend completely into valley 33 between adjacent keys. Thus, in a most preferred embodiment of the invention, it is preferable if the length of the sidewall portions D of the membrane (measured along the sidewall of the key) is less than the height H of the key (measured along the sidewall of the key).

It should thus be appreciated that when a key is actuated by pressing key cover portion 28 membrane 24 the sidewall portions 30, 32 will deform as shown at 35, 37 but will not be placed in compression nor will they bind in valley 33 and thus the "touch" or "feel" of the individual keys will be preserved. FIG. 2 illustrates the orientation of the membrane 24 when key 16 is in its operative (down) position.

Figure 3:
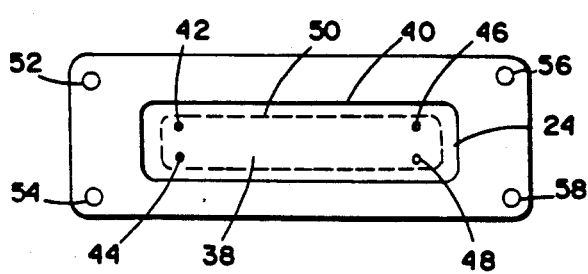
FIG. 3 is a schematic representation of the obverse face of the keyboard assembly illustrating the arrangement of the sealing plate and membrane cover.
Figure 3A:
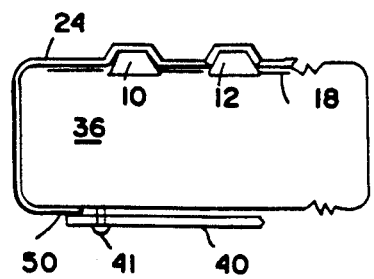
FIG. 3a is a particular side view of the keyboard assembly of FIG. 3 enlarged to show details of the arrangement of the sealing plate and membrane cover.

In another embodiment of the invention it is desired to completely enclose the keyboard assembly by means of a low-cost membrane. As is shown in FIG. 3a the keyboard assembly 36 is completely covered with membrane 24 except for opening 38 (FIG. 3). The opening 38 exposes the lower portion of the keyboard assembly 36 but is otherwise completely encapsulated by membrane 24. A means such as a mental or plastic plate 40 may be fastened to the keyboard assembly by means of suitable fastening devices, such as screws (not shown in FIG. 3) so as to compress the tailpiece 50 of membrane 24 between plate 40 and keyboard assembly 36. As is more clearly illustrated in FIG. 3a, screw 41 facilitates the compression of tailpiece 50 of membrane 24 between plate 40 and keyboard assembly 36. This compression permits membrane 24 to act as a seal thereby completely enclosing the keyboard from outside contaminants such as water, dust, etc. Plate 40 may carry supporting feet 42, 44, 46, 48. Alternatively the feet 52, 54, 56, 58, if provided on the keyboard assembly, may be covered by the tailpiece 50 of membrane 24.

By the use of a resilient material such as the aformentioned silicone rubber elastomer, membrane 24 may be fashioned by conventional molding techniques such as injection, transfer molding or vacuum forming techniques about and undercut core (not shown). However, due to the resilient nature of the membrane 24, the core (not shown) used to form the interior surface of the membrane 24 may be extracted from the interior of membrane 24 by temporarily deforming membrane 24 so as to permit removal of the core. The core need not be made of multiple parts but may be of unitary construction with its exterior surface approximating the exterior configuration of the keyboard assembly to be protected.

It will therefore be appreciated that the present invention provides a membrane cover or boot for a keyboard array which totally prevents contamination of the keyboard assembly by complete encapsulation not only of the keyboard array but also the deck portions thereof and which acts as a seal for a metal plate or cover on the face of the keyboard assembly obverse the keys. Additionally, the present invention permits the retention of the "touch" or "feel" of the individual keys by the operator even when the keyboard cover is in its operative position on the keyboard array.

It will be understood that modifications and variations may be affected without departing from the scope of the novel concepts of the present invention, but it is understood that this application is to be limited only by the scope of the appended claims.

We claim:

1. A protective cover for a keyboard assembly having a key array comprising a plurality of keys, a deck portion and an obverse face opposite said key array, said cover comprising:
    a shaped membrane corresponding to a general profile and spacing of the key array of the keyboard assembly;
    said membrane having integral lateral portions for covering the deck portion of said keyboard assembly and having a tailpiece for at least partially extending over said obverse portion of said keyboard assembly; and
    a plate for compressing said tailpiece of said membrane, wherein the keys of said key array have a top surface and four key lateral portions surface and key said general profile of the shaped membrane has corresponding top surface and key lateral portions wherein said corresponding key lateral portions of said membrane each have a dimension which is less than a dimension from said top surface to said deck portion.

2. A protective cover for a keyboard assembly having a key array comprising a plurality of keys, each key having a top portion and sidewall portions, and a deck portion, said cover comprising:
    a membrane having shaped portions corresponding to said plurality of keys in said key array;
    said shaped portions having a top portion which approximates said top portion of a corresponding key and sidewall portions extending from said top portion towards said deck portion, each of said portions extend a distance less than a distance from said top portions to said deck portion.

3. The protective cover of claim 2, wherein the sidewall portions are of a thickness less than said top portion.

4. The protective cover of claim 2, wherein the membrane is formed of elastomeric material.

5. The protective cover of claim 2, wherein the membrane is formed of silicone rubber.

6. The protective cover of claim 5, wherein the silicone rubber is transparent.

7. The protective cover of claim 2, wherein at least a portion of the membrane extends to a face of the keyboard assembly obverse the key array.

8. The protective cover of claim 7, wherein a plate compresses the membrane portion extending to the obverse face of the keyboard assembly.

9. The protective cover of claim 2, wherein the membrane is generally opaque to light except that said top portion comprise light transparent portion of the cover.

10. A protective cover for a keyboard assembly having a key array comprising a plurality of keys, and a deck portion, said cover comprising:
    a shaped membrane corresponding to a general profile and spacing of the key array of the keyboard assembly;
    said membrane having integral portions for covering the deck portion of said keyboard assembly, wherein the keys of said key array have a top surface and four lateral portions and said general profile of the shaped membrane has corresponding top surface and lateral portions wherein said corresponding lateral portions of said membrane each have a dimension which is less than a dimension from said top surface to said deck portion.

* * * * *